United States Patent [19]

Gräser

[11] 4,260,593

[45] Apr. 7, 1981

[54] PROCESS FOR THE MANUFACTURE OF AMMONIUM SULFAMATE

[75] Inventor: Reinhold Gräser, Frankfurt am Main, Fed. Rep. of Germany

[73] Assignee: Hoechst Aktiengesellschaft, Frankfurt am Main, Fed. Rep. of Germany

[21] Appl. No.: 127,565

[22] Filed: Mar. 6, 1980

[30] Foreign Application Priority Data

Mar. 8, 1979 [DE] Fed. Rep. of Germany ....... 2909033

[51] Int. Cl.$^3$ .......................................... C01B 21/093
[52] U.S. Cl. .................................................. 423/388
[58] Field of Search ................................. 423/388, 389

[56] References Cited

U.S. PATENT DOCUMENTS 4,133,870  1/1979  Gräser ................................. 423/388

*Primary Examiner*—G. O. Peters
*Attorney, Agent, or Firm*—Curtis, Morris & Safford

[57] ABSTRACT

German published patent application 2,710,399 discloses a process for the manufacture of ammonium sulfamate involving introducing sulfur trioxide and ammonia into a pressure vessel containing a melt that mainly consists of ammonium sulfamate and ammonium imidosulfamate, while maintaining a molar ratio between $NH_3$ and $SO_3$ from 1.5:1 to 1.99:1. It has now been found that the pressure vessel is suitably released from pressure for a short period of time after prolonged reaction times to discharge thus the main quantity of the collecting inert gases.

1 Claim, No Drawings

PROCESS FOR THE MANUFACTURE OF AMMONIUM SULFAMATE

German Offenlegungsschrift No. 27,10,399 discloses a process for the manufacture of ammonium sulfamate involving introducing sulfur trioxide and ammonia into a pressure vessel containing a melt that substantially consists of ammonium sulfamate and ammonium imidosulfonate. In this process there is maintained a molar ratio between $NH_3$ and $SO_3$ of from 1.5:1 to 1.99:1 and the gases collecting above the molten phase are not removed from the pressure vessel.

It has now been found that the gaseous phase of the reactor contains after prolonged reaction times significant portions of inert gas when using technical-grade ammonia, for technical-grade ammonia contains traces of inert gases, depending on the process employed, in addition to water. These gases are mainly $H_2$, $N_2$, $CH_4$, $CO_2$ and argon. The quantity of the inert gases depends on the feed gas used for the synthesis of ammonia and on the process conditions of the ammonia synthesis. Quantities of inert gases, for example from 0.01 to 0.1 volume % have been detected in gas samples of technical-grade ammonia. Liquid ammonia contains from 0.1 to 0.3% of water. Upon evaporation the water is substantially retained in the residue, according to the vapor pressure conditions, while the dissolved gases pass quantitively into the gaseous phase.

When performing the process of DE-OS 27,10,399 with technical-grade ammonia instead of pure ammonia, the portions of inert gas in the gaseous zone over the melt may increase thus involving a reduction of the ammonia partial pressure above the melt, although the pressure introduced from outside remains unchanged. A decrease of ammonia partial pressure involves an increase of the portion of ammonium imidodifulonate in the melt, (at constant residence time), until finally ammonium imidodisulfonate is formed nearly exclusively, which, however, precipitates from the melt owing to its high melting point. Thus stirring is no longer possible when the melt contains at least 40% of ammonium imidodisulfonate and when the temperature drops below 150° C.

It is known that elementary sulfur and nitrogen are formed in minute quantities from ammonia and sulfur trioxide under the conditions of the process of DE-OS 27,10,399. This nitrogen, too, may lower the ammonia partial pressure above the melt, especially at a temperature above 300° C. However, when using pure ammonia, this diminution of the ammonia partial pressure may be neglected, for small amounts of inert gas dissolve in the withdrawn ammonium sulfamate melt.

The object of the present invention is therefore to suppress the increased formation of ammonium imidodisulfonate caused by progressive collection of inert gases in the pressure vessel.

The present invention therefore represents a modification of the process for the manufacture of ammonium sulfamate according to DE-OS 27,10,399 involving introducing sulfur trioxide and ammonia into a pressure vessel containing a melt that substantially consists of ammonium sulfamate and ammonium imidodisulfonate, with maintaining a molar ratio between $NH_3$ and $SO_3$ from 1.5:1 to 1.99:1. The process of the invention comprises releasing shortly the pressure from the pressure vessel after prolonged reaction periods and discharging thus the main quantity of the collecting inert gases.

Generally a short relieve from pressure at 3 to 10 hours' intervals suffices to remove the main quantity of the collected inert impurities, it being possible to recover the ammonia portion of the discharged gases and to reuse it, although this method requires great technical expenditure. Operating for a prolonged period of time without interruptions is possible when the quantity of impurities present in the feed gas or formed in the course of the reaction is particularly low. The introduction of ammonia and sulfur trioxide may be discontinued during the pressure release or ammonia may be further introduced alone or in conjunction with sulfur trioxide. In this case, however, the conduits for the pressure release and for introducing ammonia and sulfur trioxide should be positioned at different points of the pressure reactor.

In the modification of the process of DE-OS 27,10,399 according to the invention the pressure release is suitably performed at the top of the spherical cap of the cover of the pressure vessel used, with the gas zone above the melt acting as precipitator.

The reaction partners may be introduced in the following manner:

Liquid or gaseous sulfur trioxide is introduced while stirring into a melt consisting of the reaction products obtained in the reaction of sulfur trioxide and ammonia while maintaining a constant ammonia pressure above the melt. The sulfur trioxide reacts with the ammonia dissolved in the melt to yield ammonium sulfamate and ammonium imidodisulfonate and with the melt itself to yield ammoniumhydrogenoimidodisulfonate which latter undergoes a further reaction in the melt or at the interface between the melt and the gas with ammonia to yield ammonium sulfamate and ammonium imidodisulfonate. Moreover unreacted sulfur trioxide may react with ammonia at the interface between the gas and the melt or in the gaseous zone itself. The ammonia pressure in the gaseous phase above the melt can be kept constant by adding ammonia required for the reaction with the sulfur trioxide and thus a loss of reaction products in liquid or solid form can be prevented.

Especially efficient cooling is reached by using liquid ammonia as reaction component.

The ammonia partial pressure in the gaseous zone of the pressure vessel should be suitably at least 1 bar, preferably from 5 to 16 bars. The reaction temperatures are suitably in the range from 120° to 350° C.

The following examples and the comparative example serve to illustrate the present invention:

Comparative Example 135 kg of $SO_3$ and 55 kg of gaseous technical-grade ammonia per hour were introduced at a temperature of 215° C. into a vessel provided with a stirrer, of 3 m³ volume and that had been charged with 1.5 m³ of an ammonium sulfamate melt (content of ammonium imidodisulfonate 13.7%). The pressure was 7.5 bars. Ammonia containing an the average 0.05% of inert gases was introduced under pressure into the stirred melt. 195 kg per hour of molten product were withdrawn from the reactor. The content of ammonium imidodisulfonate therein, depending on the operating time, was determined. It can be seen from the following table that the ammonium imidodisulfonate portion increases the longer the time of operating.

| Operating time in hrs | Content of NH(SO$_3$NH$_4$)$_2$ in weight % |
| --- | --- |
| 0 | 13.7 |
| 8 | 14.2 |
| 20 | 15.8 |
| 32 | 17.4 |
| 44 | 19.5 |
| 56 | 21.1 |
| 59 | 22.2 |
| 63 | 38.0 |

Apparently the sulfur trioxide reacts preferably with the melt after prolonged operating and the acid salts of the imido-disulfonic acid formed thereby lead to a progressive formation of ammonium imidodisulfonate.

EXAMPLE 1

220 kg/h of sulfur trioxide were reacted at 205° C. under a pressure of 7.5 bars with 90 kg/h of technical-grade ammonia in the vessel with stirrer of the comparative example, which was filled with 1.5 m$^3$ of a melt containing 18% of ammonium imidodisulfonate. At 6 hours' intervals 13.3 kg of ammonia were additionally fed to the reactor for 10 minutes, thus increasing the average molar ratio between NH$_3$ and SO$_3$ from 1.92 to 1.97. During this additional addition for 10 minutes a blow-off valve was partially opened simultaneously to maintain the pressure. The test was run for 5 days. In this time the content of the melt of ammonium imidodisulfonate was constantly 18%.

What is claimed is:

1. In a process for the manufacture of ammonium sulfamate by introducing sulfur trioxide and ammonia into a pressure vessel containing a melt that substantially consists of ammonium sulfamate and ammonium imidodisulfonate, while maintaining a molar ratio between NH$_3$ and SO$_3$ from 1.5:1 to 1.99:1 the improvement which comprises releasing the pressure vessel shortly from pressure after prolonged reaction periods and thus discharging the main quantity of the collecting inert gases.

* * * * *